United States Patent [19]

Boston et al.

[11] Patent Number: 5,235,263
[45] Date of Patent: Aug. 10, 1993

[54] METHOD AND APPARATUS FOR CORRECTING HYSTERESIS SYNCHRONOUS MOTOR HUNTING

[75] Inventors: W. Thomas Boston, North Andover; James A. Carl, Littleton, both of Mass.; John L. Connolly, III, Newton, N.H.

[73] Assignee: ECRM Trust, Tewksbury, Mass.

[21] Appl. No.: 844,279

[22] Filed: Mar. 2, 1992

[51] Int. Cl.$^5$ ............................................. H02D 5/16
[52] U.S. Cl. ................................. 318/701; 318/723; 219/121.6; 388/812; 359/484
[58] Field of Search ........... 219/121.6, 121.78, 121.79, 219/121.8; 359/290, 484; 388/812, 820; 318/715, 701, 717, 721, 723

[56] References Cited

U.S. PATENT DOCUMENTS

| | | | |
|---|---|---|---|
| 3,562,615 | 2/1971 | Nasu et al. | 388/820 |
| 3,985,952 | 10/1976 | Alder | 359/290 |
| 4,112,367 | 9/1978 | Hepner et al. | 359/484 |
| 4,532,402 | 7/1985 | Overbeck | 219/121.78 |
| 4,710,691 | 12/1987 | Bergstrom et al. | 318/696 |

Primary Examiner—William M. Shoop, Jr.
Assistant Examiner—John W. Cabeca
Attorney, Agent, or Firm—Hale and Dorr

[57] ABSTRACT

A method and apparatus for accurately controlling a hysteresis synchronous motor velocity eliminate low frequency hunting, which is characteristic of the motor. A nominal input phase current is modified by providing feedback information, thereby enabling a microprocessor control system to modify the phase of quadrature input current signal to the motor and thereby eliminating hunting of the motor. Accordingly, in a high resolution scanning application, speed variations which could cause disturbing artifacts to appear in an output image are eliminated. Velocity control, better than 15 parts per million, can be achieved 7 Claims, 2 Drawing Sheets

BLOCK DIAGRAM OF LASER RECORDER IMPLEMENTATION

METHOD AND APPARATUS FOR CORRECTING HYSTERESIS SYNCHRONOUS MOTOR HUNTING

BACKGROUND OF THE INVENTION

The invention relates generally to hysteresis synchronous motors, and in particular, to controlling hysteresis synchronous motors used in applications which require extremely constant rotational velocity.

Hysteresis synchronous motors can provide very constant rotational speed when driven from a crystal oscillator based input frequency. The operation of the motor is as follows. A pair of quadrature drive signals, which may be either square waves or sinusoidal, are applied to a pair of motor windings which form the stator of the motor. The alternating stator drive currents generate a magnetic field which rotates at the frequency of the stator drive signals.

The rotor is composed of a solid piece of ferrous material. The magnetic field from the energized stator windings induces a magnetic flux in the rotor thereby forming corresponding magnetic poles. The rotating magnetic field and the rotor magnetic field interact to generate a torque that causes the rotor and motor shaft to rotate. In response, the rotor accelerates until the angular velocity of the rotor matches that of the rotating magnetic field.

Any angular displacement between the rotating field and the rotor poles produces a restoring torque in the opposite direction. In response, the rotor velocity changes to reduce the angle thereby causing the rotor's frequency of rotation to match the frequency of the rotating field. It is this operation that provides the hysteresis motor with an excellent long term stability.

FIG. 1 shows a block diagram of an electromechanical model of a hysteresis synchronous motor. The motor can be modeled as a second order system. More specifically, the open loop gain of the motor is represented by equation 1 below:

$$G(S) = \frac{K_m}{S \cdot (J \cdot S + B)} \quad (1)$$

where $K_m$ is a motor constant, J is the motor's inertia, B is a damping factor, and S is a Laplace variable. For a typical motor, these values can be: $K_m = 0.049 n \times m/rad$; $J = 1 \times 10^{-4} kg \times m^2$; and $B = 5 \times 10^{-4} n \times m \times s/rad$.

The closed loop motor transfer function is represented by equation 2 below:

$$\frac{p_o}{p_i} = \frac{K_m}{J \cdot S^2 + B \cdot S + K_m} \quad (2)$$

where $p_i$ is a Phase input, and $p_o$ is a Phase output. In a more standard form, the closed loop motor transfer function is represented by equation 3 below:

$$\frac{p_o}{p_i} = \frac{K_m/J}{S^2 + (B/J) \cdot S + K_m/J} \quad (3)$$

Unfortunately, the dynamic response of this type of motor is often underdamped, due to the low damping factor B, and the size of the inertia J. Thus, the rotor frequency tends to drift above and below the desired frequency (i.e., the frequency of the stator drive signals) as the rotor constantly attempts to match the desired frequency. For example, a rotor which spins at a nominal rate between 150-200 rotations per second typically "hunts" at a very low frequency of about 3 to 5 hertz around the nominal velocity. This hunting rate is referred to as the motor's "natural frequency" $\omega_n$ and is represented by equation 4 below:

$$\omega_n = \sqrt{K_m/J} \text{ (rad/sec)} \quad (4)$$

A feedback servo control device is typically used to reduce hunting and obtain an extremely constant rotational velocity. Toward this end, a tachometer or shaft encoder is connected to measure the instantaneous rotor frequency. A feedback servo controller monitors the measured rotor frequency and continuously adjusts the frequency of the stator drive signals in an effort to maintain the rotor frequency at a constant desired frequency.

In some applications, such a feedback servo controller is prohibitively expensive. Accordingly, if the frequency drift can be tolerated, a hysteresis synchronous motor is used without feedback control. However, if very high resolution is required, some mechanism must be used to eliminate or reduce the frequency drift inherent in a hysteresis synchronous motor. For example, laser scanners used in printing devices require high precision. The hunting of the motor produces artifacts which are easily visible to the eye. These artifacts in the printing (or scanning) process detract, from the image and provide a clearly less desirable result.

It is therefore an object of the present invention to provide a low-cost reliable, precise control mechanism to eliminate low frequency hunting in a hysteresis synchronous motor. Other objects of the invention are a method and apparatus employing existing equipment for controlling the synchronous motor in a precise manner.

SUMMARY OF THE INVENTION

The invention relates to a method and apparatus for controlling the rotational velocity of a hysteresis synchronous motor having a low frequency hunting characteristic. The method features the steps of generating a nominal input phase value for controlling phase current to the motor, the current having a nominal phase value; repeatedly generating a measurement of the rotation time for a single rotation of the motor; deriving a derivative phase value from the rotation time measurements; adjusting the input phase value in response to the derivative phase value to achieve a selected rotational damping phase value; and adjusting a current applied to control the motor in response to the adjusted input phase value for damping the low frequency hunting of the motor.

The method further features the steps of measuring the rotation time using a sensor responsive to energy reflected by a mirror mounted on and rotating with the motor shaft and using a microprocessor for adjusting the nominal phase of the applied motor-driving current. The method further features controlling the rotational velocity of the motor using a microprocessor.

In another aspect, the apparatus of the invention features circuitry for generating a nominal input phase value for controlling phase current to the synchronous motor, the current having a nominal phase value. Circuitry is provided for measuring the motor rotation time, and for deriving a derivative phase value from the rotation time measurement of the motor. The input nominal phase value is adjusted in response to the derivative phase value to achieve a selected rotational damping phase value. Circuitry is provided for adjusting the current applied to the motor in response to the adjusted nominal phase value for damping low frequency hunting of the motor.

Preferably, the measurement of the rotation time uses a sensor positioned to intercept energy reflected by a mirror rotating with and mounted on the motor shaft, and a microprocessor is used for controlling the phase of the applied current to achieve the selected rotational velocity.

BRIEF DESCRIPTION OF THE DRAWINGS

Other objects, features, and advantages of the invention will be apparent from the following drawings in which.

DESCRIPTION OF A PREFERRED EMBODIMENT

Figure 3:
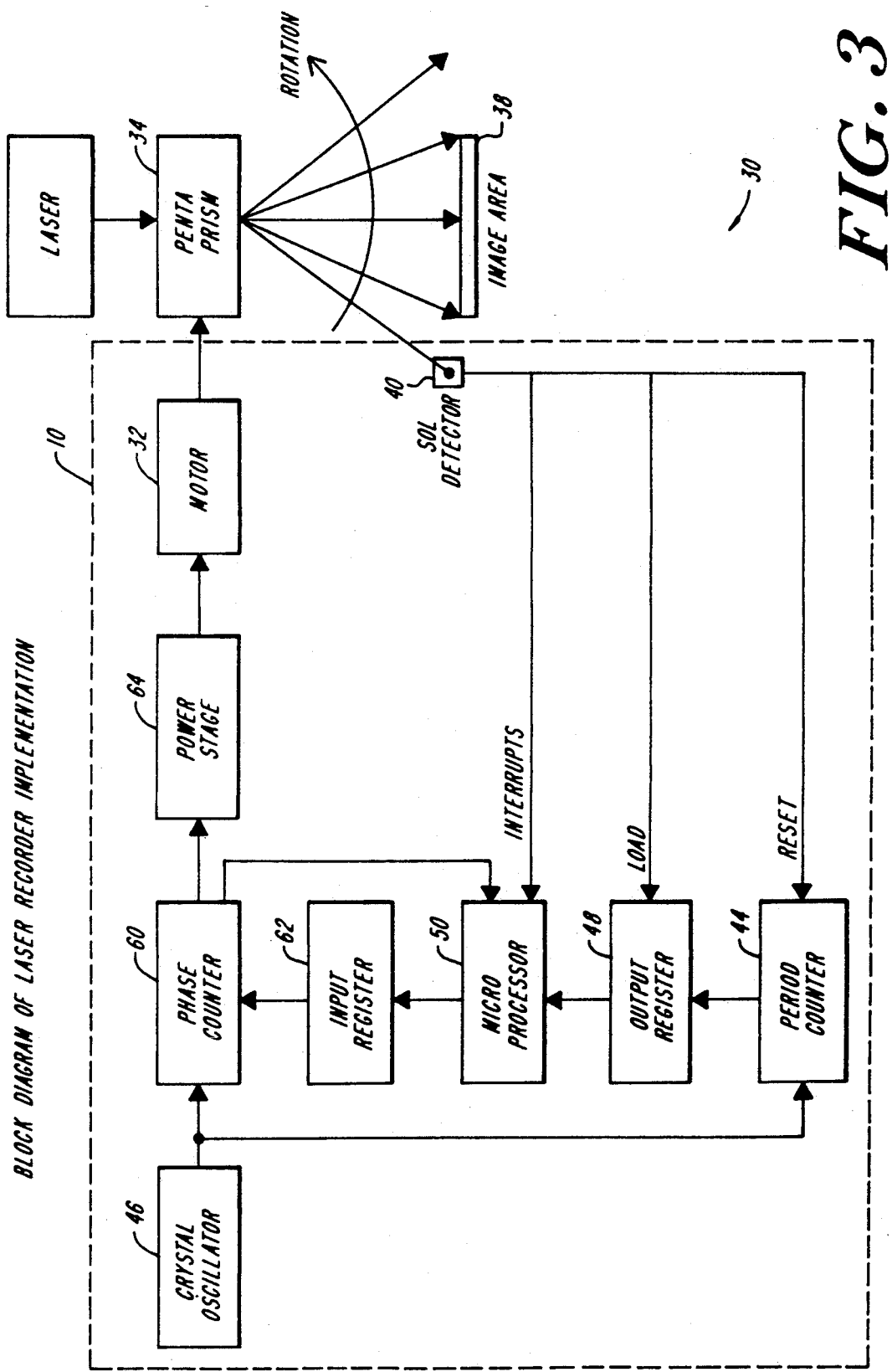
FIG. 3 is a block diagram of the motor control circuitry in accordance with the invention.

Referring to FIG. 3, in accordance with the preferred embodiment of the invention, a circuitry 10 controls operation of a hysteresis synchronous motor 32. The motor scans the light output of a light source, for example a laser diode, across an image plane in a straight line. The laser diode is turned on and off as it is scanned across the scan line using well known control techniques. In order to lay down a sequence of equally spaced picture elements (pels) the rotational velocity of the synchronous motor should be constant. Small variations of the motor velocity change the spacing between pels and cause undesirable artifacts to appear in the finished image.

The invention includes the use of feedback to alter the dynamic response of a hysteresis synchronous motor to eliminate or reduce hunting.

As indicated in equations 2 and 3, the dynamic response can be adjusted by altering the damping factor B. However, the B term is a characteristic of the motor itself, and is not easily increased without decreasing motor efficiency. Therefore, modifying this parameter to improve dynamic response is not practical.

Similarly, the dynamic response can be improved by reducing the motor's inertia J. However, this is not easily accomplished since the bulk of the inertia is in the rotor, and the desired properties of the rotor constrain its inertia.

Figure 1:
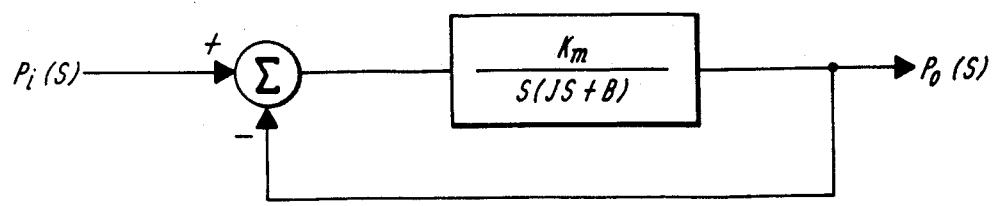
FIG. 1 is a block diagram of an electromechanical model for a hysteresis synchronous motor.
Figure 2:
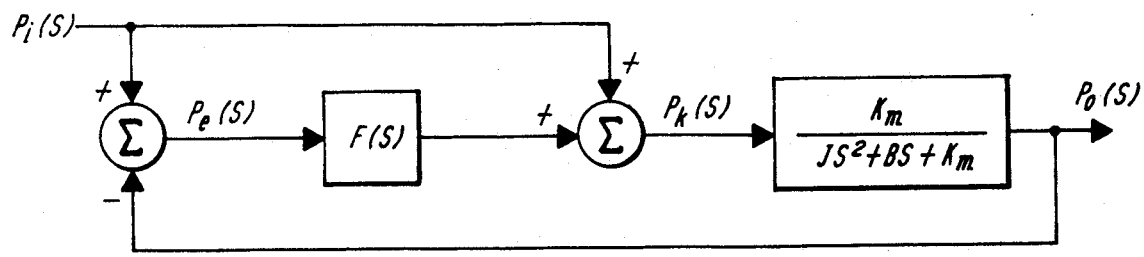
FIG. 2 is a block diagram of an electromechanical model of a modified hysteresis synchronous motor in accordance with the preferred embodiment of the invention.

The solution, therefore, according to the invention, is to provide additional feedback to the motor, with the feedback transfer function chosen so as to affect only the damping term of the closed loop response. FIG. 2 shows a block diagram of an electromechanical model of the motor and an added feedback network. An analysis of this configuration is as follows:

$$P_3(S) = P_i(S) - P_o(S) \quad (5)$$

$$P_k(S) = P_i(S) + P_e(S) \cdot F(S) \quad (6)$$

$$p_k(S) = \frac{J \cdot S^2 + B \cdot S + K_m}{K_m} \cdot p_o(S) \quad (7)$$

Substituting 5 into 6 and equating the result with 7 gives $$\frac{J \cdot S^2 + B \cdot S + K_m}{K_m} \cdot p_o(S) = \quad (8)$$

$$p_i(S) + p_i(S) \cdot F(S) - p_o(S) \cdot F(S)$$

Rearranging we get $$P_o(S) \cdot [J \cdot S^2 + B \cdot S + K_m + K_m \cdot F(S)] = (1 + F(S)) \cdot P_i(S) \cdot K_m \quad (9)$$

Which yields the following transfer function $$\frac{p_o(S)}{p_i(S)} = \frac{(1 + F(S)) \cdot K_m}{J \cdot S^2 + B \cdot S + K_m \cdot F(S) + K_m} \quad (10)$$

Letting $F(S) = S \cdot K_d$ where Kd is the derivative gain yields $$\frac{p_o(S)}{p_i(S)} = \frac{[1 + S \cdot K_d] \cdot K_m}{J \cdot S^2 + [B + K_m \cdot K_d] \cdot S + K_m} \quad (11)$$

Putting it into standard form gives $$\frac{p_o}{p_i} = \frac{[1 + S \cdot K_d] \cdot [K_m/J]}{S^2 + \frac{[B + K_m \cdot K_d]}{J} \cdot S + \frac{K_m}{J}} \quad (12)$$

The transfer function given by Equation 12 differs from that of Equation 3 in only two respects. First, it has a different coefficient in the damping term. Second it has an additional "zero" from the S term in the numerator. It is important to note that the natural frequency has not been altered. The additional "zero" shows up in the numerator only, and therefore does not affect stability of the motor operation. The "zero" affects only the closed loop gain, and therefore it can be compensated for elsewhere if necessary. In this illustrated embodiment of the invention, it is not necessary to compensate for the "zero" because the phase input is not being modulated.

The important change is the effect on the damping term. There is now a coefficient, $k_d$, in that term that can be used to modify the damping of the motor system without affecting any other parameters.

There are several important points to note. First, this approach is inherently different than building a servo loop around the motor, which is the traditional approach to solving this problem. The primary advantages of this approach over the servo loop approach are (1) there is no sacrifice in bandwidth, and (2) the feedback requirements are less demanding, leading to a less expensive implementation. A servo loop around the motor would either have to be closed at a lower frequency than the closed loop bandwidth of the motor itself or would require additional compensation in order to be stable. Also a servo loop requires accurate feedback over its entire bandwidth. The described compensation approach only requires accurate feedback up to the hunting frequency, so that its feedback element can have much lower bandwidth. Because the hunting frequency is typically very low compared to the motor's nominal rate of rotation, it is feasible to sample the feedback on a once per revolution basis. As noted below, in the illustrated embodiment, this can greatly reduce the cost of the feedback mechanism.

Referring now to FIG. 3, a laser recorder 30 uses a hysteresis synchronous motor 32 to rotate a penta-prism 34 which deflects a light beam across a piece of film or other light sensitive medium 38 which moves perpendicularly to the scan, thus forming a raster. Just prior to entering the image area on each revolution, the laser beam crosses a start of line (SOL) detector 40 and thereby generates a pulse that is used to synchronize the beam modulation for that scan. By using the SOL 40 as the feedback element for the motor damping, it is possible to achieve high performance at a fraction of the cost required to servo the motor. In this illustrated embodiment, the hunting frequency is approximately 3 to 5 Hz, and the SOL frequency is approximately 175 Hz. The sampling rate (175 Hz) is therefore sufficient to meet the feedback requirements as described herein.

A period counter 44, incremented from a high frequency crystal oscillator 46, counts the number of clock ticks between successive SOL pulses. Each SOL pulse operates to store the period counter value in an output register 48, resets the counter 44, and interrupts a microprocessor 50. In response to the SOL interrupt, the microprocessor reads the counter 44 output register value and computes the derivative of the feedback. It then multiplies this by the derivative gain factor and stores the result as the phase correction value. The derivative is computed using a central difference algorithm so that the derivative gain rolls off at high frequencies. This minimizes the amplification of noise that might occur with a pure differentiator, and still gives good derivative performance at the low frequencies where the hunting occurs.

This method is slightly different than the method indicated in FIG. 2 and its associated equations. FIG. 2 indicates that F(S), the derivative operation, should be performed on the phase error as defined in Equation 5, which would yield the following expression.

$$\frac{d_{pe}}{dt} = \frac{d_{pi}}{dt} - \frac{d_{po}}{dt} \qquad (13)$$

In this application, the input phase is constant, so that its derivative is zero. The expression then reduces to:

$$\frac{d_{pe}}{dt} = -\frac{d_{po}}{dt} \qquad (14)$$

It is therefore sufficient to only take the derivative of the feedback. No comparison to the input phase is necessary.

The phase drive to the motor is generated by a phase counter 60 which runs from the same crystal based source as the period counter 44. The output of the counter 60 is converted into a pair of quadrature waveforms which then go into a power stage amplifier 64 which amplifies the voltage and provides the square wave drive to the motor. The phase counter 60 also has an associated input register 62. When the counter overflows, it reloads from the input register, the motor phases are switched, and an interrupt is generated. In response to this interrupt, the microprocessor increments an internal counter which lets the software keep track of which phase has just switched, and then it reloads the counter input register 62 with the nominal phase value. When phase zero is reached (there is an arbitrary assignment of phases 0 through 3), the previously computed phase correction is summed with the nominal phase modulated motor drive signal necessary to cancel the velocity hunting.

The amount of control attainable is in part determined by the frequency used to run the period counter and phase counter. A typical laser scanning application requires the phase error to remain within 30 parts per million (ppm). If a clock rate of 32 MHz is used with the 175 Hz SOL frequency, there results a resolution of 5.4 ppm.

Addition, subtractions, deletions, and other modifications of the illustrated embodiment of the invention will be apparent to those practiced in this field and are within the scope of the following claims.

What is claimed is:

1. A method for controlling the rotational velocity of a hysteresis synchronous motor having a low frequency hunting characteristic, comprising the steps of
    generating a nominal input phase value for controlling phase current to said motor, said current having a nominal phase value,
    repeatedly generating a measurement of a rotation time for a single rotation of said motor,
    deriving a derivative phase value from said rotation time measurements,
    adjusting said input phase value by said derivative phase value to achieve a selected rotational damping phase value, and
    adjusting the phase current applied to control said motor in response to said adjusted input phase value for damping low frequency hunting of said motor.

2. The method of claim 1 further comprising the steps of
    measuring said rotation time using a sensor responsive to energy reflected by a mirror rotating on a motor shaft, and
    using a microprocessor for adjusting the nominal phase of the applied current.

3. The method of claim 1 wherein said current adjusting step is controlled by a microprocessor.

4. An apparatus for controlling hysteresis synchronous motor velocity having a low frequency hunting characteristic comprising
    means for generating a nominal input phase value for controlling phase current to said motor, said current having a nominal phase value,
    means for repeatedly generating a measurement of a rotation time for a single rotation of said motor,
    means for deriving a derivative phase value from said rotation time measurement of said motor,
    means for adjusting said input nominal phase value in response to said derivative phase value to achieve a selected rotational damping phase value, and
    means for adjusting the phase current applied to said motor in response to said adjusted input phase value, for damping low frequency hunting of said motor.

5. The apparatus of claim 4 further comprising
    said means for generating a measurement of said rotation time is a sensor responsive to energy reflected by a mirror rotating on a motor rotating shaft, and
    a microprocessor circuitry for adjusting the phase of the applied current.

6. The apparatus of claim 5 where said current adjusting means is controlled by said microprocessor.

7. An apparatus for controlling hysteresis synchronous motor rotational velocity having a low frequency hunting characteristic comprising:
- a microprocessor,
- a mirror mounted on a rotating shaft of the motor for reflecting energy from a scanning energy source,
- a start of line detector for providing an electrical pulse output in response to said energy source being traversed across the detector as the mirror rotates on the motor shaft,
- a period counter,
- a phase counter,
- a high frequency clock source,
- means for applying the output of the period counter to the microprocessor,
- means for outputting a microprocessor phase count to the phase counter,
- means for applying the output of the clock source to the phase counter and the period counter,
- means for applying the output of the detector to the microprocessor and the period counter,
- means for interrupting the microprocessor when the phase counter overflows,
- said microprocessor having
- means for reading the period counter when the detector outputs a pulse,
- means for deriving a derivative of the data received from the period counter for generating a phase correction for compensating for the hunting of the synchronous motor,
- means for outputting the derived phase correction from the microprocessor to the phase counter, and
- means for deriving quadrature signals from the phase counter, as loaded, from time to time, by the microprocessor, for controlling the frequency of rotation of said synchronous motor.

* * * * *

UNITED STATES PATENT AND TRADEMARK OFFICE
CERTIFICATE OF CORRECTION

PATENT NO. : 5,235,263
DATED : August 10, 1993
INVENTOR(S) : Boston et al

It is certified that error appears in the above-indentified patent and that said Letters Patent is hereby corrected as shown below:

Column 3, line 66, Equation (5),
"$P_3(S)$" should be --$P_e(S)$--.

Column 4, line 15, Equation (9),
"$[J \cdot S^{a+B} \cdot S + K_m + K_m \cdot F(S)]$" should be --$[J \cdot S^2 + B \cdot S + K_m + K_m \cdot F(S)]$--.

Column 6, Claim 5, line 63, "further comprising" should be --wherein--.

Column 6, Claim 5, line 66, after "and," insert --further comprising--.

Signed and Sealed this

Tenth Day of May, 1994

Attest:

BRUCE LEHMAN

Attesting Officer    Commissioner of Patents and Trademarks